(12) United States Patent
Strzalkowski

(10) Patent No.: US 9,590,517 B2
(45) Date of Patent: *Mar. 7, 2017

(54) HIGH BANDWIDTH, HIGH EFFICIENCY DC-DC MULTILEVEL CONVERTER TOPOLOGY

(71) Applicant: Analog Devices, Inc., Norwood, MA (US)

(72) Inventor: Bernhard Strzalkowski, Munich (DE)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,010

(22) Filed: May 11, 2015

(65) Prior Publication Data

US 2015/0288292 A1    Oct. 8, 2015

Related U.S. Application Data

(63) Continuation of application No. 13/715,073, filed on Dec. 14, 2012, now Pat. No. 9,030,844.

(51) Int. Cl.
*H02M 3/335*    (2006.01)
*H02M 3/158*    (2006.01)
*H02M 1/00*    (2006.01)

(52) U.S. Cl.
CPC ....... *H02M 3/33592* (2013.01); *H02M 3/158* (2013.01); *H02M 3/33569* (2013.01); *H02M 2001/0093* (2013.01); *Y10T 307/549* (2015.04)

(58) Field of Classification Search
CPC .............................. H02M 3/335; H02M 3/158
See application file for complete search history.

(56) References Cited

U.S. PATENT DOCUMENTS

| | | |
|---|---|---|
| 8,098,500 B2 | 1/2012 | Heo et al. |
| 8,587,252 B2 | 11/2013 | Reggio et al. |
| 9,030,844 B2 | 5/2015 | Strzalkowski |
| 2006/0139823 A1 | 6/2006 | Shoji et al. |
| 2009/0244934 A1 | 10/2009 | Wang et al. |
| 2014/0169039 A1 | 6/2014 | Strzalkowski |

OTHER PUBLICATIONS

"U.S. Appl. No. 13/715,073, Non Final Office Action mailed Sep. 2, 2014", 14 pgs.
"U.S. Appl. No. 13/715,073, Notice of Allowance mailed Jan. 23, 2015", 10 pgs.
"U.S. Appl. No. 13/715,073, Response filed Oct. 30, 2014 to Non Final Office Action mailed Sep. 2, 2014", 11 pgs.

*Primary Examiner* — Emily P Pham
(74) *Attorney, Agent, or Firm* — Schwegman Lundberg & Woessner, P.A.

(57) ABSTRACT

A multilevel DC-DC converter includes a voltage source that provides a voltage Vout1 to at least one charge converter circuit and an output filter capacitor having an associated output voltage Vout2. The at least one charge converter circuit includes a transformer having at least one primary winding and at least two secondary windings, a primary and secondary circuit each having at least two switching elements, and a control unit which receives a control signal, such as but not limited to an envelope tracking signal, which represents a desired output voltage. The control unit is arranged to provide output control signals to the respective switching elements of the primary and secondary circuits to activate and deactivate the respective switching elements to obtain a desired output voltage Vout2. The multilevel DC-DC converter can be arranged to operate as a boost converter or as a buck-boost converter.

20 Claims, 4 Drawing Sheets

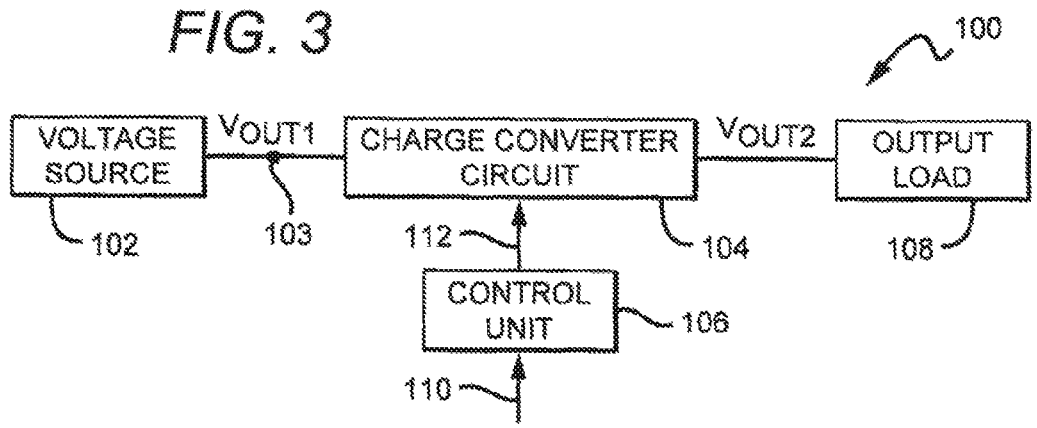
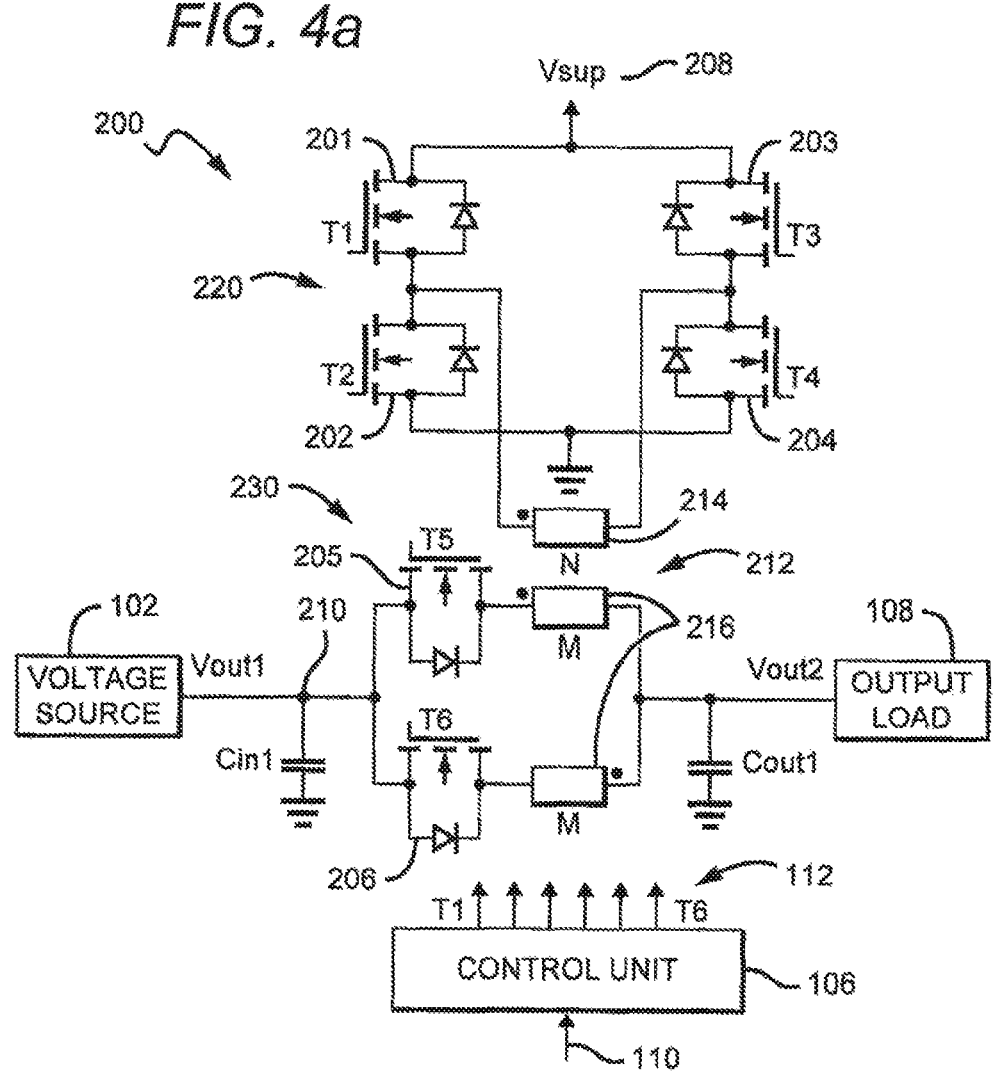

US 9,590,517 B2

HIGH BANDWIDTH, HIGH EFFICIENCY DC-DC MULTILEVEL CONVERTER TOPOLOGY

CLAIM OF PRIORITY

This patent application is a Continuation of U.S. patent application Ser. No. 13/715,073, filed Dec. 14, 2012, and is incorporated by reference herein.

BACKGROUND OF THE INVENTION

Field of the Invention

Embodiments of the invention relate to DC-DC converters and, more particularly, to multilevel topologies for such converters.

Description of the Related Art

DC-DC converters are a class of power converter. They are used to convert a direct current (DC) signal from one voltage level to another. These converters are commonly used in portable electronic devices that are powered by batteries, such as laptops and cellular phones. DC-DC converters are particularly useful in applications that have several different sub-systems, requiring several different voltage input levels.

There are several different schemes for DC-DC conversion. Linear regulators convert an input voltage to a lower output voltage by dissipating power through thermal radiation. For larger voltage drop high-current applications, these devices are inefficient and, thus, rarely used. A more commonly used scheme is switched-mode conversion. Switched-mode converters convert voltages by periodically storing energy in inductive and/or capacitive components and then releasing that energy to produce the desired voltage level. Inductive components store energy in the form of a magnetic field, whereas capacitive components store energy in an electric field.

DC-DC converters that use a magnetic energy storage mechanism employ inductors or transformers. The output voltage is controlled by modulating the duty cycle of the voltages used to charge the inductive component. Common types of magnetic storage DC-DC converters include buck and boost converters.

FIG. 1a and FIG. 1b are circuit diagrams of a typical boost converter 10. Energy is periodically stored in an inductor L and then released to the load. During each periodic cycle, a switch S is used to allow current to flow through the inductor. When the switch is closed, current flows through the inductor and stores energy from the current in a magnetic field. During this time, the switch acts like a short circuit in parallel with the diode and the load, so no inductor current flows to the load. When the switch is opened, the short circuit is removed and inductor current is allowed to flow through the load; this increases the impedance of the circuit, which requires either a decrease in current or an increase in voltage to maintain a constant output voltage. The inductor will tend to resist such a sudden change in the current, which it does by acting as a voltage source in series with the input source, thus increasing the total voltage seen by the load and thereby preserving (for a brief moment) the current level that was seen when the switch was closed. This is done using the energy stored by the inductor. Over time, the energy stored in the inductor will discharge into the load, bringing the net voltage back down. If the switch is cycled fast enough, the inductor will not discharge fully in between charging stages, and the load will always see a voltage greater than that of the input source alone when the switch is opened.

FIG. 2a and FIG. 2b are circuit diagrams of a typical buck converter 20. Energy is periodically stored in an inductor L and then released to the load. During each periodic cycle, two switches $SW_H$ and $SW_L$ are used to alternately connect one end of inductor L to input source $V_{IN}$ during the charge phase and to ground during the discharge phase. When the high side switch $SW_H$ is closed (shown in FIG. 2a), current through the inductor L ($I_L$) rises linearly, charging the inductor L. Then $SW_H$ is opened and the low side switch $SW_L$ is closed (shown in FIG. 2b), and $I_L$ decreases linearly, discharging the inductor into the load. As the inductor L is discharging, $I_L$ decreases but still flows in the same direction into the load because the stored magnetic energy prevents the current through the inductor from changing direction instantaneously. The switches are turned on and off periodically at a fixed frequency such that the duty cycle determines the ratio of output voltage to input voltage. If the high side switch is opened before the inductor is fully charged, there will always be a voltage drop across the inductor, such that the net voltage seen by the load will always be less than the input voltage source.

At least one challenge associated with boost and buck converters are a reduced efficiency at high switching frequencies, as well as power loss. In some applications, for example wireless applications, in order to increase the power efficiency, the converter providing the supply voltage can be modulated using "envelope tracking," wherein the converter is arranged such that its output voltage tracks an envelope signal. However, converters using envelope tracking need to change the output voltage in short time periods, such as a matter of a few nanoseconds. During the short time periods, the converters have to charge and discharge filter capacitors in the range of several microfarads. This fast charging/discharging calls for high frequency and high power converters, which can be bulky and inefficient.

SUMMARY OF THE INVENTION

A multilevel DC-DC converter is presented which overcomes the problems noted above. A voltage source provides a voltage Vout1 to at least one charge converter circuit. The at least one charge converter circuit can be comprised of several elements, such as: a transformer having at least one primary winding and at least two secondary windings; a primary circuit having at least two primary switches; a secondary circuit having at least two secondary switches, wherein the secondary windings are coupled to an output filter capacitor; and a control unit arranged to receive a control signal which represents a desired output voltage Vout2 and to provide output control signals to the primary and secondary switches in order to activate and deactivate the switches to obtain the desired output voltage Vout2 on the output filter capacitor, such that the voltage level of Vout2 is controlled by the control signal.

These and other features, aspects and advantages of the present invention will become better understood with reference to the following description and claims.

BRIEF DESCRIPTION OF THE DRAWINGS

FIG. 3 is a block diagram of a multilevel DC-DC converter according to an embodiment of the invention.

FIG. 4a is a circuit diagram of a multilevel DC-DC converter according to an embodiment of the invention.

FIG. 4b is a timing diagram for the multilevel DC-DC converter of FIG. 4a.

FIG. 5b is a timing diagram for the multilevel DC-DC converter of FIG. 5a.

DETAILED DESCRIPTION OF THE INVENTION

Figure 1A:
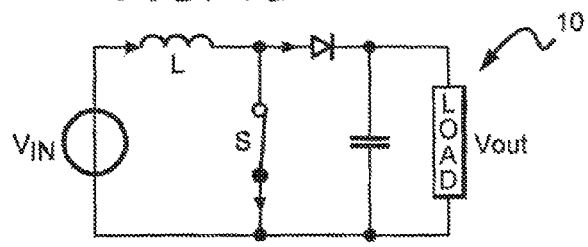
FIG. 1a is a circuit diagram of a boost converter that is known in the art with a Switch S in a closed-state.
Figure 1B:
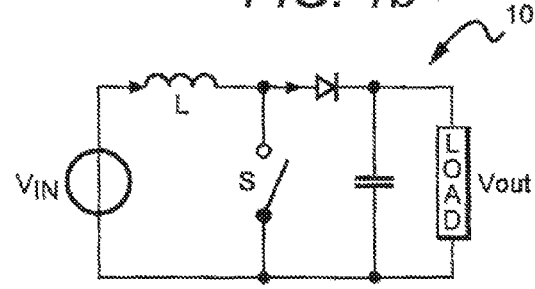
FIG. 1b is a circuit diagram of the boost converter of FIG. 1a with the Switch S in an open-state.
Figure 2A:
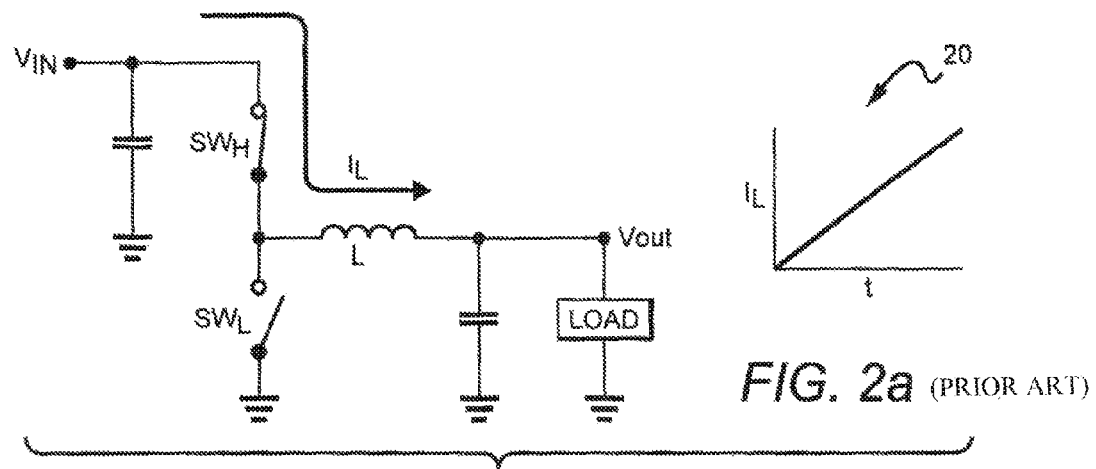
FIG. 2a is a circuit diagram of a buck converter that is known in the art with a high side switch operating in an on-state.
Figure 2B:
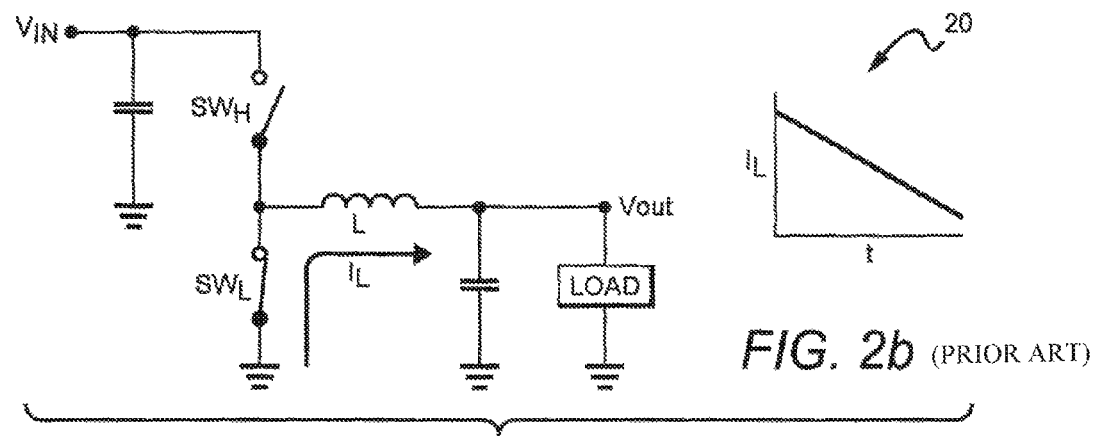
FIG. 2b is a circuit diagram of a buck converter of FIG. 2a with a low side switch operating in the on-state.

Embodiments of the invention provide a multilevel DC-DC converter that utilizes a control signal to provide a desired output voltage.

FIG. 3 shows a block diagram of a multilevel DC-DC converter 100 according to an embodiment of the invention. A voltage source 102 provides a voltage Vout1 at a node 103 that is fed into a charge converter circuit 104. The charge converter circuit 104 is adapted to be connected to external components to produce a desired output voltage Vout2 at an output load 108. A control unit 106 is arranged to receive a control signal 110, such as but not limited to an envelope tracking signal, which represents a desired output voltage Vout2, whereby the control unit provides output control signals 112 to the charge converter circuit 104 such that the output control signals provide operational instructions to the charge converter circuit 104 to obtain the desired output voltage Vout2. The voltage source 102 is arranged to provide a voltage source to the charge converter circuit 104. In one embodiment, the voltage source 102 can be a battery, while in other embodiments voltage source can be the output of another circuit, such as but not limited to a galvanically non-isolated converter, a galvanically isolated converter, a forward converter, a buck converter, or any constant voltage source known in the art.

The charge converter circuit 104 comprises at least one switching element wherein the at least one switching element is adapted to be switched on and off in response to the output control signals 112 provided by the control unit 106. The control unit 106 is arranged to control a switching period during which the at least one switching element is switched on and off to provide the desired output voltage Vout2. The charge converter circuit 104 is governed by the control unit 106 such that the charge converter circuit produces an output voltage Vout2 that is substantially similar to the desired output voltage represented by the control signal 110.

FIG. 4a shows a multilevel DC-DC converter 200 according to an embodiment of the invention. FIG. 4a is meant to convey one embodiment of the general system of FIG. 3, such that the discussion below details the operation of the multilevel DC-DC converter 200 with reference to one possible exemplary embodiment. Thus, it is understood that other embodiments according to the claims are possible. In one embodiment of the invention, the multilevel DC-DC converter 200 comprises a voltage source 102 that provides a voltage Vout1 at a node 210 that is fed into a charge converter circuit, whereby the charge converter circuit provides an output voltage Vout2 at an output load 108.

In the embodiment shown in FIG. 4a, the charge converter circuit comprises a transformer 212 including a primary winding 214 and two secondary windings 216. The transformer 212 is configured to be a center-tapped transformer, though other transformer types could also be used. The charge converter circuit further comprises a primary circuit 220 and a secondary circuit 230, with the primary circuit 220 having four primary switches 201, 202, 203, 204, and the secondary circuit 230 having two secondary switches 205, 206, wherein the primary and secondary switches may be N-channel MOSFETs, as shown in FIG. 4a.

The primary switches 201-204 are arranged in a bridge configuration with one end of the primary winding 214 coupled to the node between primary switches 201 and 202 and the other end of the primary winding 214 coupled to the node between primary switches 203 and 204. A supply voltage Vsup 208 is provided to the primary circuit 220 which is used to induce a voltage step Vs in secondary circuit 230 that is combined with Vout1 to produce the desired output voltage Vout2.

The secondary circuit 230 has a first pair of secondary switches 205, 206, each of which is connected to a respective one of the secondary windings 216 between the first node 210 and the output load 108. As shown in FIG. 4a, the first pair of secondary switches 205, 206 are arranged parallel to each other wherein the voltage source 102 is connected to the source of each of the secondary switches 205, 206 while the respective drains of the secondary switches are connected to a respective secondary winding 216 of the transformer 212. In other embodiments, the first pair of secondary switches 205, 206 can be arranged such that the source of each of the secondary switches is connected to a respective secondary winding 216, while the respective drains of the secondary switches are connected to the output load 108. The secondary switches are arranged such that the secondary circuit operates as a synchronous rectifier, allowing the multilevel DC-DC converter to operate in continuous conduction mode.

The gate of each of the primary switches 201-204 and secondary switches 205, 206 are connected to the control unit 106, such that the output control signals 112 can be applied to the respective gates of the primary switches 201-204 and the secondary switches 205, 206. The output control signals 112 cause the primary switches 201-204 and secondary switches 205, 206 to activate and deactivate over a time period that is determined by the control signal 110 received by the control unit 106. The four primary switches 201-204 are grouped into two pairs, with one pair being switches 201/204 and the second pair being switches 202/203. The pairs of primary switches operate in complementary fashion, such that when the first pair 201/204 is activated, the second pair of switches 202/203 are deactivated, and vice versa. A switch which is activated conducts current, while a switch which is deactivated does not. For purposes of this discussion, $t_{on}$ represents the time during a period when the first pair of primary switches 201/204 are activated and the second pair of primary switches 202/203 are deactivated, and $t_{off}$ represents the time during the period when the first pair of primary switches 201/204 are deactivated and the second pair of primary switches 202/203 are activated. The control unit 106 is preferably arranged to be an envelope tracking unit that receives an envelope tracking signal 110. However, the invention is not intended to be limited to an envelope tracking application. In other embodiments, the control unit 106 can be a bi-directional converter or the like.

The secondary switches 205, 206 are activated and deactivated based on the output control signals 112, in conjunction with the primary switches 201-204. When the first pair of primary switches 201/204 is activated, the secondary switch 206 is activated and the secondary switch 205 is deactivated. When the second pair of primary switches 202/203 is activated, the secondary switch 205 is activated and the secondary switch 206 is deactivated. While the primary switches 201-204 and the secondary switches 205, 206 are operating, the charge current converter can inject charges into the output capacitor Cout1 to get a fast voltage rise, such that the multilevel DC-DC converter of FIG. 4a operates as a boost converter. Voltage source 102 can be any voltage source, such as a buck or boost converter.

Figure 4B:
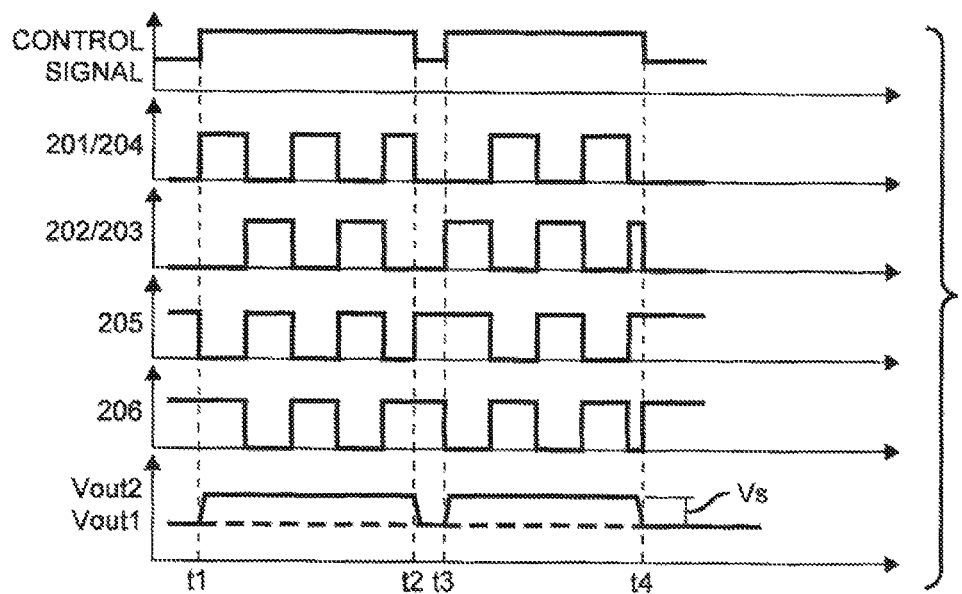

FIG. 4b shows a timing diagram which illustrates the operation of the multilevel DC-DC converter of FIG. 4a. The control signal 110 represents the desired output voltage Vout2 that is to be provided by the charge converter circuit. When the desired output voltage Vout2 is equal to the voltage Vout1 (prior to time t1) that is delivered to the charge converter circuit (Vout1=Vout2) by the voltage source 102, all the primary switches 201-204 are deactivated and the secondary switches 205, 206 are activated so that the output current flows from the voltage source 102 through the secondary windings 216 and into the filter capacitor Cout1. In this configuration, the secondary windings 216 generate magnetic fluxes in opposite directions. As such, the resulting magnetic flux in the transformer 212 is canceled out and is substantially zero. As a result, there is effectively no inductance between the voltage source 102 and the output filter capacitor Cout1.

When the output voltage Vout2 at the output filter capacitor Cout1 is required to increase, as indicated by the control signal 110 at time t1, the first pair of primary switches 201/204 are activated, the secondary switch 205 is deactivated, and the secondary switch 206 remains activated; or, if the secondary switch 206 is deactivated, then it is to be activated along with the first pair of primary switches 201/204. The secondary windings 216 act as a voltage source connected between Cin1 and Cout1, causing a very fast voltage offset on Cout1 such that the multilevel DC-DC converter 200 operates as a forward converter. As seen in FIG. 4b, this causes output voltage Vout2 to increase to a value greater than that of voltage source Vout1. The voltage increase of the output voltage Vout2 at the capacitor Cout1 will increase by a voltage step Vs according to:

$$Vs = Vsup * (M/N) \qquad \text{Eq. 1}$$

where Vsup is the supply voltage 208 that is provided to the primary circuit 220 and M/N is the turn ratio of the transformer 212. The level of the voltage step Vs can be determined by either the level of the supply voltage Vsup or by the turn ratio of the transformer. The supply voltage Vsup 208 is combined with Vout1 to produce the desired output voltage Vout2. As such, the multilevel DC-DC converter exhibits a step granularity based on the voltage step Vs, such that the step granularity is in the range of 0, Vs.

During the next period, the first pair of primary switches 201/204 and the secondary switch 206 are deactivated and the second pair of primary switches 202/203 and the secondary switch 205 are activated. The output voltage Vout2 at the capacitor Cout1 is maintained at the increased value due to the voltage step Vs. This process continues, with the number of periods determined by the control signal 110. The turn ratio of the transformer 212 is designed to deliver high current into the capacitor Cout1. Since the high current for quickly charging the capacitor Cout1 is delivered by the transformer 212 with a high turn ratio, there is no need for the primary circuit to utilize high current switches. There are no direct capacitive charges and discharges between the two capacitances, such that there are no charge/discharge losses in the switches. As such, the multilevel DC-DC converter efficiency is increased considerably. The transformer 212 can have many different turn ratios, such as but not limited to 5:1 through 10:1, but other turn ratio values are also possible.

When the control signal 110 indicates that the desired output voltage Vout2 is to return to the value of the voltage source Vout1 102 (time t2), then the activated primary switches 201-204 will become deactivated and the secondary switches 205, 206 will become or remain activated.

As shown in FIG. 4b, at time t1, there is a delay in increasing the output voltage Vout2 by the voltage step Vs, and at time t2 there is a delay in decreasing the output voltage Vout2. These delays are due to the primary switches 201-204 and the secondary switches 205, 206 receiving the output control signals 112 from the control unit 106 and then activating or deactivating the switches in response to the output control signals 112. For example, the primary and secondary switches 201-206 are shown as N-channel MOSFETs in FIG. 4a, and an N-channel MOSFET is activated when the voltage of the output control signal 112 on the gate exceeds the MOSFET's threshold voltage. When the gate receives a command to activate the MOSFET switch, it takes some time for the gate voltage to exceed the threshold voltage and thereby activate the MOSFET switch. Furthermore, when an activated MOSFET switch receives a command to deactivate the switch, the voltage at the gate takes some time to reduce to 0 volts, or below the threshold voltage. As such, there can be a time delay between a command to activate and/or deactivate the primary and secondary switches 201-206. In order to reduce the time delay, the gate of each switch can be pre-biased, such that the switch is provided with a deactivation voltage that is slightly below the threshold voltage of the switch instead of 0 volts, such that once an activation command is received by the switch, the switch already has a voltage at the gate that is close to the threshold voltage and thus less time is required to raise the voltage at the gate above the threshold voltage and thereby activate the switch. This serves to improve the bandwidth of the multilevel DC-DC converter.

The multilevel DC-DC converter of FIGS. 4a and 4b is configured to be a two-level DC-DC boost converter. The two-level DC-DC boost converter is able to increase the output voltage by one voltage step Vs, such that the converter can generate the desired output voltage Vout2 to be equal to voltage Vout1 or voltage Vout1+voltage step Vs.

Figure 5A:
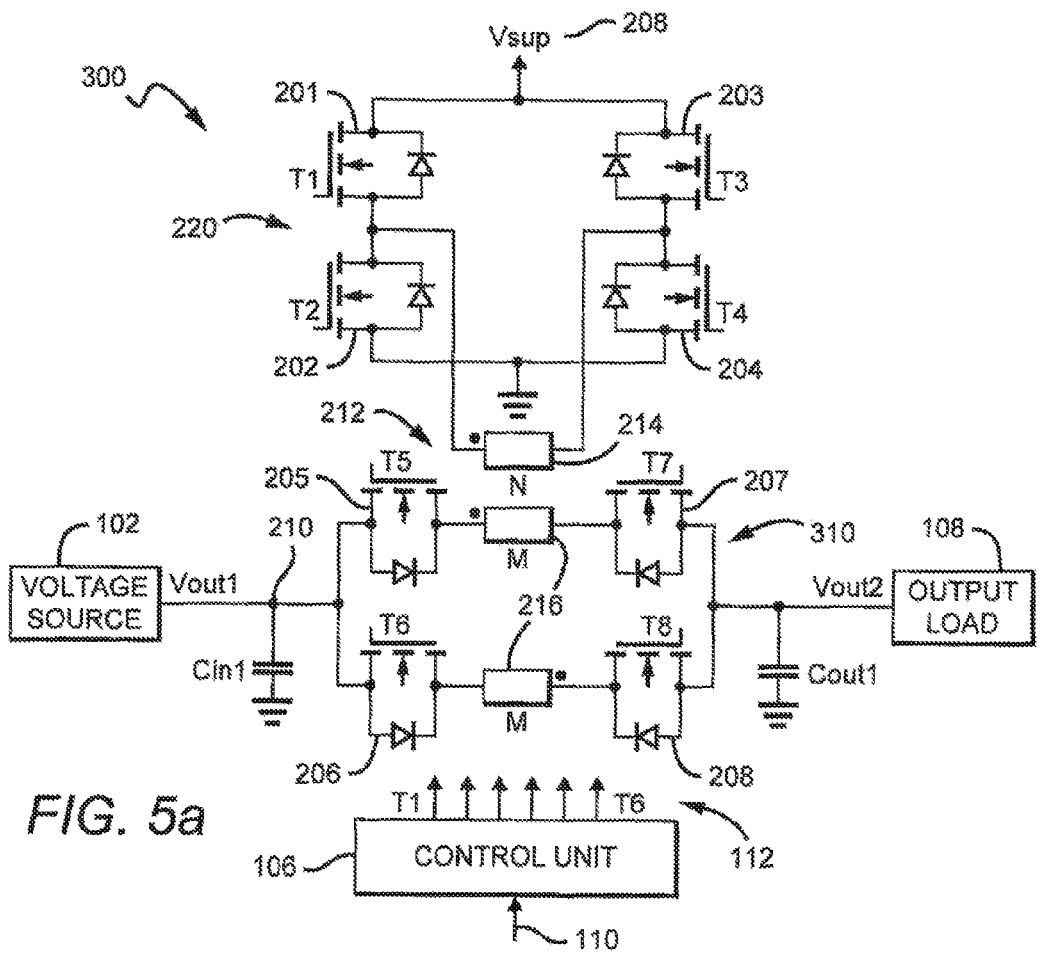
FIG. 5a is a circuit diagram of a multilevel DC-DC converter according to an embodiment of the invention.

The embodiment of the multilevel DC-DC converter shown in FIG. 5a is configured to be a three-level DC-DC buck-boost converter. The three-level DC-DC converter of FIG. 5a is configured similarly to the two-level DC-DC converter of FIG. 4a. However, the secondary circuit 310 of FIG. 5a is comprised of four secondary switches 205-208, forming a first pair of secondary switches 205/206 and a second pair of secondary switches 207/208, wherein the second pair of secondary switches is connected to the secondary windings 216 opposite the first pair. For the same or similar elements or features, the same reference numbers will be used throughout the application.

The inclusion of the second pair of secondary switches 207, 208 allows the multilevel DC-DC converter of FIG. 5a to operate as a buck-boost converter. The voltage step Vs is combined with the voltage Vout1 to produce the desired output voltage Vout2 at the capacitor Cout1. For example, the voltage step Vs can be added to increase the output voltage Vout2 by a voltage step Vs, which is calculated according to Eq. 1 discussed above. In other instances, output voltage Vout2 can be reduced by the voltage step Vs such that the output voltage Vout2 is the difference between the voltage Vout1 and the voltage step Vs.

Figure 5B:
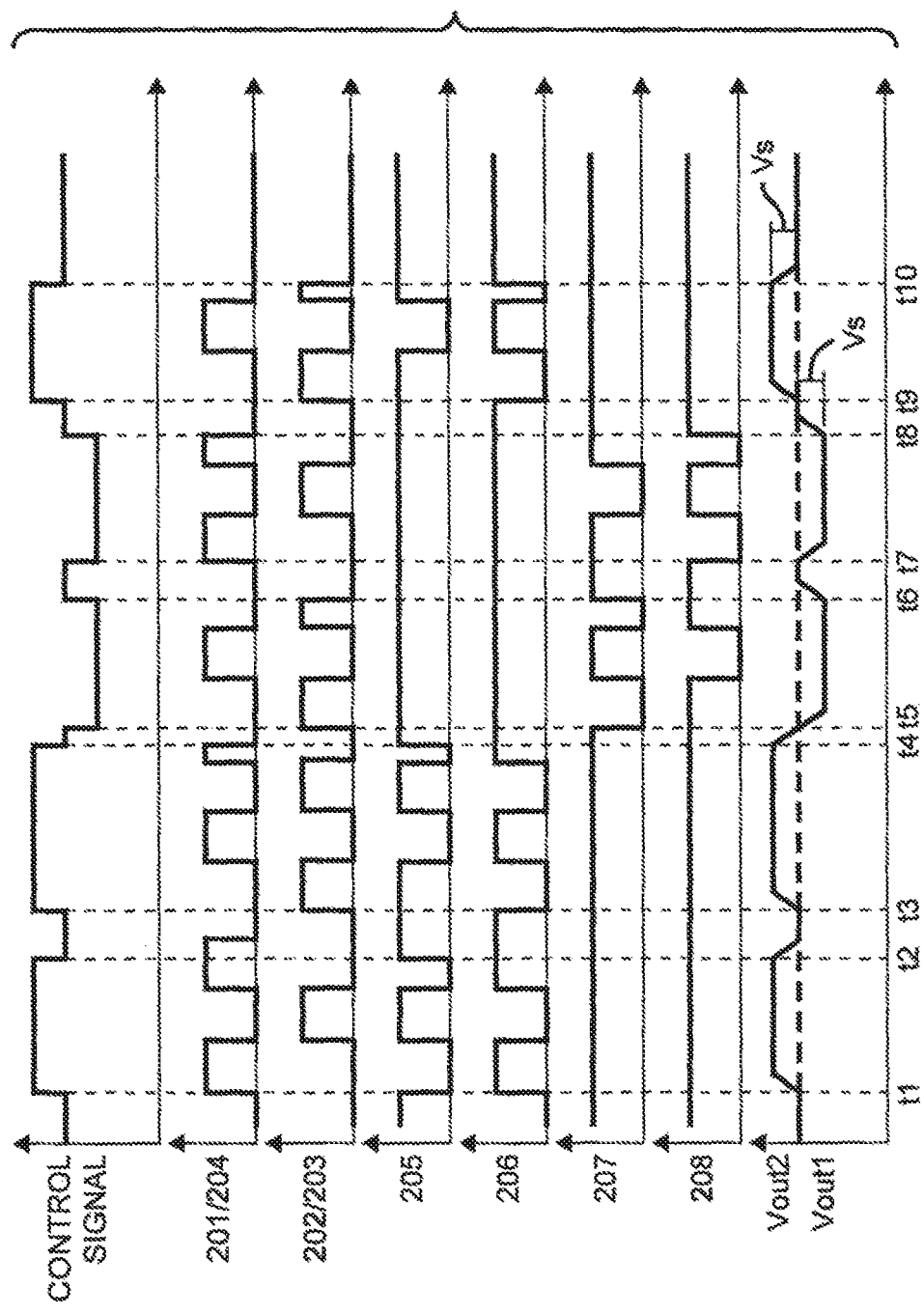

FIG. 5b shows a timing diagram for the converter of FIG. 5a during operation. The control signal 110 represents the desired output voltage Vout2 and provides instructions to the primary switches 201-204 and the secondary switches 205-208. When the output voltage Vout2 is set to be equal to the voltage Vout1 that is delivered to the charge converter circuit (Vout1=Vout2) by the voltage source 102 (prior to time t1), all the primary switches 201-204 are deactivated and all the secondary switches 205-208 are activated. In this configuration, the output current flows from the voltage source 102 through secondary windings 216 and into the filter capacitor Cout1, similarly as described above.

When the output voltage Vout2 is set to increase (time t1), the first pair of primary switches 201/204 are activated, while secondary switch 205 is deactivated and secondary switches 206-208 are activated or remain activated. As seen in FIG. 5b, the output voltage Vout2 rises to a value greater than the voltage source Vout1 by a voltage step Vs. During the next period, the first pair of primary switches 201/204 and the secondary switch 206 are deactivated and the second pair of primary switches 202/203 and the secondary switch 205 are activated, while the second pair of secondary switches 207, 208 remain activated. This process continues, with the number of periods determined by the control signal 110. In this configuration, the converter of FIG. 5a, 5b is functioning as a boost converter. When in boost mode, the secondary switches 207 and 208 must remain activated.

In order for the converter of FIG. 5a, 5b to operate in buck mode, the control signal 110 provides instructions to the primary switches 201-204 and secondary switches 205-208 so that the voltage of the voltage source Vout1 is reduced by the voltage step Vs in order to provide the reduced output voltage Vout2. In such a configuration, the first pair of secondary switches 205/206 must remain activated while the second pair of secondary switches 207/208 are arranged to toggle between activated and deactivated. For example, at time t5 of FIG. 5b, primary switches 202/203 and secondary switch 208 are activated, while secondary switch 207 is deactivated. At this point, output voltage Vout2 is less than voltage Vout1 by the voltage step Vs. In the next period, primary switches 201/204 and secondary switch 207 are activated, while primary switches 202/203 and secondary switch 208 are deactivated; the first pair of secondary switches 205/206 remain activated and the output voltage Vout2 remains at the reduced value. This process continues for as many periods as indicated by the control signal 110.

In order for the output voltage Vout2 to be less than the voltage Vout1 by the voltage step Vs, the charge converter circuit discharges the output capacitor Cout1 and transfers the energy into the primary circuit 212. The primary circuit 212 can store this energy in the form of a magnetic field due to the primary winding 214 of the transformer 212. The voltage step Vs is calculated similarly as discussed above and is a function of the supply voltage Vsup provided to the primary circuit and the turn ratio of the transformer 212. The step granularity of the multilayer DC-DC converter of FIG. 5a has a range of −Vs, 0, Vs. The timing diagram in FIG. 5b also shows that the converter exhibits a time delay in increasing or decreasing the output voltage Vout2, similar to the converter of FIG. 4a. As such, the primary switches 201-204 and secondary switches 205-208 can be pre-biased, similarly as discussed above, to reduce the time delay.

It must be noted that the circuits illustrated herein are merely exemplary. The order of the circuit elements in the multilevel converter can be modified and still achieve the same result. It should be also noted that there may be additional circuits in the multilevel converter in addition to those discussed herein. For example, the charge converter circuit can be comprised of a plurality of converter circuits such as a first charge converter circuit and a second charge converter circuit arranged in a cascade configuration, wherein either the first or second charge converter circuit can be a boost converter or a buck-boost converter. In such a cascaded configuration, the first converter circuit can be adapted to increase or decrease its output voltage by a first voltage step Vs1=Vsup*M1/N1, where Vsup is the supply voltage and M1/N1 is the turn ratio of a first transformer associated with the first charge converter circuit. The output of the first charge converter circuit would be inputted into the second charge converter circuit, wherein the second charge converter circuit is adapted to increase or decrease the desired output voltage Vout2 by a second voltage step Vs2=Vsup*M2/N2, where Vsup is the supply voltage and M2/N2 is the turn ratio of a second transformer associated with the second charge converter circuit. The supply voltage Vsup can be the same for both the first and second charge converter circuits. However, in other embodiments, the first and second charge converter circuits can have respective supply voltages Vsup which are different. The step granularity of the cascaded converters would be determined by the lowest valued voltage step between the first voltage step Vs1 and the second voltage step Vs2. In yet another embodiment, the charge converter circuit can be arranged to be comprised of a push-pull circuit instead of a transformer based circuit.

While particular embodiments of the invention have been shown and described, numerous variations and alternate embodiments will occur to those skilled in the art. Accordingly, it is intended that the invention be limited only in terms of the appended claims.

I claim:

1. A DC-DC converter circuit, comprising:
a voltage source which provides a voltage Vout1 at a first node;
an output filter capacitor having an associated output voltage Vout2; and
at least one charge converter circuit, comprising:
a transformer having at least one primary winding and at least two secondary windings;
a primary circuit having at least two primary switches connected between a supply voltage and respective sides of the primary winding;
a secondary circuit having at least two secondary switches, wherein a first pair of said secondary switches are connected to respective ones of the secondary windings between the first node and the output filter capacitor; and
a control unit arranged to:
receive a control signal, wherein the control signal represents a desired output voltage Vout2; and
provide output control signals to the primary and secondary switches including to activate and deactivate the primary and secondary switches as needed to obtain the desired output voltage Vout2, including to deactivate the primary switches and to activate the secondary switches when Vout1=Vout2, such that magnetic flux in the transformer is substantially zero.

2. The DC-DC converter circuit of claim 1, said control unit arranged to operate said primary and secondary switches as needed to discharge energy from said output filter capacitor and transfer the discharged energy into said primary circuit when said control signal indicates that Vout2 is to decrease.

3. The DC-DC converter circuit of claim 1, said control unit arranged to operate said primary and secondary switches as needed to charge said output filter capacitor when said control signal indicates that Vout2 is to increase.

4. The DC-DC converter circuit of claim 1, wherein said primary switches and secondary switches are configured to be pre-biased to reduce the switching time required to activate and deactivate said primary or secondary switches.

5. The DC-DC converter circuit of claim 1, wherein said at least one charge converter circuit is comprised of a first charge converter circuit and a second charge converter circuit arranged in a cascade configuration, wherein either of said first or second charge converter circuits can be a boost converter circuit or a buck-boost converter circuit.

6. The DC-DC converter circuit of claim 1, wherein said primary circuit is comprised of four primary switches and said secondary circuit is comprised of two secondary switches.

7. A multilevel DC-DC converter, comprising:
a voltage source which provides a voltage Vout1 at a first node;
an output filter capacitor having an associated output voltage Vout2; and
at least one charge converter circuit, comprising:
a transformer having at least one primary winding and at least two secondary windings;
a primary circuit having at least two primary switches connected between a supply voltage and respective sides of said primary winding;
a secondary circuit having at least two secondary switches, wherein a first pair of said secondary switches are connected to respective ones of the secondary windings between the first node and the output filter capacitor; and
a control unit arranged to:
receive a control signal, wherein the control signal represents a desired output voltage Vout2; and
provide output control signals to the primary and secondary switches including to activate and deactivate the primary switches and to activate and deactivate the secondary switches over a time period when Vout2>Vout1 or when Vout2<Vout1, such that the voltage level of said desired output voltage Vout2 is substantially similar to the desired output voltage represented by the control signal.

8. The multilevel DC-DC converter of claim 7, wherein the control unit is arranged to increase or decrease said output voltage by a voltage step Vs when indicated by said control signal, wherein said voltage step Vs=Vsup*M/N, wherein Vsup is said supply voltage and M/N is a turn ratio of said transformer.

9. The multilevel DC-DC converter of claim 7, said control unit arranged to operate said primary and secondary switches as needed to discharge energy from said output filter capacitor and transfer the discharged energy into said primary circuit when said control signal indicates that Vout2 is to decrease.

10. The multilevel DC-DC converter of claim 7, said control unit arranged to operate said primary and secondary switches as needed to charge said output filter capacitor when said control signal indicates that Vout2 is to increase.

11. The multilevel DC-DC converter of claim 7, wherein said primary switches and secondary switches are configured to be pre-biased to reduce the switching time required to activate and deactivate said primary or secondary switches.

12. The multilevel DC-DC converter of claim 7, wherein said at least one charge converter circuit is comprised of a first charge converter circuit and a second charge converter circuit arranged in a cascade configuration, wherein either of said first or second charge converter circuits can be a boost converter circuit or a buck-boost converter circuit.

13. The multilevel DC-DC converter of claim 7, wherein said secondary circuit is comprised of four secondary switches, wherein a second pair of said secondary switches is connected to said secondary windings opposite said first pair.

14. A multilevel DC-DC converter, comprising:
a voltage source which provides a voltage Vout1 at a first node;
an output filter capacitor having an associated output voltage Vout2; and
at least one charge converter circuit, comprising:
a transformer having at least one primary winding and at least two secondary windings;
a primary circuit having at least two primary switches connected between a supply voltage and respective sides of the primary winding;
a secondary circuit having at least two secondary switches, wherein a first pair of the secondary switches are connected to respective ones of the secondary windings between the first node and the output filter capacitor; and
a control unit arranged to receive a control signal which represents a desired output voltage Vout2 and to provide output control signals to the primary and secondary switches such that the output control signals activate and deactivate said primary and secondary switches as needed to obtain the desired output voltage Vout2, including to increase said desired output voltage Vout2 by a voltage step Vs when indicated by the control signal, wherein the voltage step Vs=Vsup*M/N, wherein Vsup is the supply voltage and M/N is a turn ratio of the transformer.

15. The multilevel DC-DC converter of claim 14, wherein said primary switches and secondary switches are configured to be pre-biased to reduce a switching time required to activate and deactivate said primary or secondary switches.

16. The multilevel DC-DC converter of claim 14, said control unit arranged to operate said primary and secondary switches as needed to discharge energy from said output filter capacitor and transfer the discharged energy into said primary circuit when said control signal indicates that Vout2 is to decrease.

17. The multilevel DC-DC converter of claim 14, said control unit arranged to operate said primary and secondary switches as needed to charge said output filter capacitor when said control signal indicates that Vout2 is to increase.

18. The multilevel DC-DC converter of claim 14, wherein said primary switches and secondary switches are configured to be pre-biased to reduce the switching time required to activate and deactivate said primary or secondary switches.

19. The multilevel DC-DC converter of claim 14, wherein said at least one charge converter circuit is comprised of a first charge converter circuit and a second charge converter circuit arranged in a cascade configuration, wherein either of said first or second charge converter circuits can be a boost converter circuit or a buck-boost converter circuit.

20. The multilevel DC-DC converter of claim 14, wherein said primary circuit is comprised of four primary switches and said secondary circuit is comprised of two secondary switches.

* * * * *